US008145477B2

(12) United States Patent
Manjunath et al.

(10) Patent No.: US 8,145,477 B2
(45) Date of Patent: Mar. 27, 2012

(54) SYSTEMS, METHODS, AND APPARATUS FOR COMPUTATIONALLY EFFICIENT, ITERATIVE ALIGNMENT OF SPEECH WAVEFORMS

(76) Inventors: Sharath Manjunath, San Diego, CA (US); Ananthapadmanabhan A. Kandhadai, San Diego, CA (US)

( * ) Notice: Subject to any disclaimer, the term of this patent is extended or adjusted under 35 U.S.C. 154(b) by 775 days.

(21) Appl. No.: 11/566,039

(22) Filed: Dec. 1, 2006

(65) Prior Publication Data

US 2007/0185708 A1 Aug. 9, 2007

Related U.S. Application Data

(60) Provisional application No. 60/742,116, filed on Dec. 2, 2005.

(51) Int. Cl.
*G10L 11/00* (2006.01)
*G06F 17/15* (2006.01)

(52) U.S. Cl. ........ 704/207; 704/218; 704/263; 704/265; 708/422; 708/440

(58) Field of Classification Search .................. 704/207, 704/218, 263, 265; 708/422, 440
See application file for complete search history.

(56) References Cited

U.S. PATENT DOCUMENTS 3,638,004 A * 1/1972 Sloane et al. ................. 708/403
5,414,796 A 5/1995 Jacobs
5,517,595 A * 5/1996 Kleijn ........................... 704/205
5,884,253 A * 3/1999 Kleijn ........................... 704/223
5,911,128 A 6/1999 DeJaco
6,219,637 B1 4/2001 Choi
6,260,017 B1 7/2001 Das
6,324,505 B1 11/2001 Choy
6,397,175 B1 5/2002 Manjunath
6,456,964 B2 * 9/2002 Manjunath et al. ........... 704/205
6,678,649 B2 1/2004 Manjunath
6,691,084 B2 2/2004 Manjunath
6,754,630 B2 6/2004 Das
6,931,373 B1 8/2005 Bhaskar
2002/0173952 A1 * 11/2002 Mietens et al. ............... 704/219
2003/0028887 A1 2/2003 Frouin et al.
2003/0074383 A1 * 4/2003 Murphy ........................ 708/620
2004/0143439 A1 * 7/2004 Kang et al. .................... 704/262
2006/0206318 A1 9/2006 Kapoor

FOREIGN PATENT DOCUMENTS

JP 8320695 A 12/1996
JP 9050293 A 2/1997
JP 9503874 T 4/1997

OTHER PUBLICATIONS

Kleijn, et al., "A Low Complexity Waveform Interpolation Coder", 1996 IEEE International Conference on Acoustics, Speech and Signal Processing Proceedings, Conf. 21, May 7, 1996, vol. 1, pp. 212-215.

Kleijn, et al., "Encoding Speech Using Prototype Waveforms", IEEE Transactions on Speech and Audio Processing, vol. 1, No. 4, Oct. 1, 1993, pp. 386-399.

(Continued)

*Primary Examiner* — Vincent P Harper

(74) *Attorney, Agent, or Firm* — Alex C. Chen; Espartaco Diaz Hidalgo

(57) ABSTRACT

Systems, methods, and apparatus described include waveform alignment operations in which a single set of evaluated cosines and sines is used to calculate cross-correlations of two periodic waveforms at two different phase shifts.

48 Claims, 9 Drawing Sheets

OTHER PUBLICATIONS

International Search Report—PCT/US06/061529—International Search Authority—European Patent Office—Jul. 12, 2007.

Kleijn W B et al: "A low-complexity waveform interpolation coder" 1996 IEEE International Conference on Acoustics, Speech, and Signal Processing—Proceedings. (ICASSP). Atlanta, May 7-10, 1996, IEEE International Conference on Acoustics, Speech and Signal Processing—Proceedings. (ICASSP). New York, IEEE, US, vol. 1, Conf. 21, May 7, 1996 pp. 212-215, XP000618667.

Kleijn W B: "Encoding Speech Using Prototype Waveforms" IEEE Transactions on Speech and Audio Processing, IEEE Service Center, New York, NY, US vol. 1 No. 4. Oct. 1, 1993 pp. 386-399, XP000422852.

Eddie L. T. Choy. Waveform Interpolation Speech Coder at 4 kb/s. MS thesis, McGill Univ., Montreal, CA, Aug. 1998. Cover and sections 3.1-3.4 (pp. 19-49).

Jani Nurminen. Pitch-cycle waveform quantization in a 4.0 kbps WI speech coder. MS thesis, Tampere Univ. of Tech., Tampere, FI, Dec. 13, 2000. Cover and chapter 2 (pp. 4-23).

Michael Leong. Representing Voiced Speech Using Prototype Waveform Interpolation for Low-rate Speech Coding. MS thesis, McGill Univ., Montreal, CA, Nov. 1992. Cover, intro. to chap. 3, and sec. 3.1 (pp. 19-35).

Taiwanese Search Report—095144864—TIPO—Feb. 20, 2010.

Written Opinion—PCT/US06/061529, International Search Authority, European Patent Office, Jul. 12, 2007.

Li H., et al., "Non-linear prototype waveform interpolation for voiced speech encoding", Proceedings of the fifth IEEE Conference on Telecommunications, Mar. 1995, pp. 220-224.

* cited by examiner

```
max = 0; r_star = 0;

for (r = 0; r < L; r += rstep)
{       sum = 0;

        for (k = 1; k < floor(L/2); k++)
        {       X = (a[n][k]*a[n+1][k]) + (b[n][k]*b[n+1][k]);
                Y = (b[n][k]*a[n+1][k]) - (a[n][k]*b[n+1][k]);

                sum += ( X * cos(2*pi*k*r/L) );
                sum += ( Y * sin(2*pi*k*r/L) );
        }

        if (sum > max) { max = sum; r_star = r; }
}
```

FIG. 2

```
max = 0; r_star = 0;

for (r = 0; r <= floor(L/2); r += rstep)
{       sum1 = 0;
        sum2 = 0;

        for (k = 1; k < floor(L/2); k++)
        {       X = (a[n][k]*a[n+1][k]) + (b[n][k]*b[n+1][k]);
                Y = (b[n][k]*a[n+1][k]) - (a[n][k]*b[n+1][k]);

                c = cos(2*pi*k*r/L);
                s = sin(2*pi*k*r/L);

                sum1 += ( (X * c) + (Y * s) );
                sum2 += ( (X * c) – (Y * s) );
        }

        if (sum1 > max) { max = sum1; r_star = r; }
        if (sum2 > max) { max = sum2; r_star = L - r; }
}
```

FIG. 3

```
max = 0; r_star = 0

for (k = 1; k < floor(L/2); k++)
{               X[k] = (a[n][k]*a[n+1][k]) + (b[n][k]*b[n+1][k]);
                Y[k] = (b[n][k]*a[n+1][k]) - (a[n][k]*b[n+1][k]);
}

for (r = 0; r < L; r += rstep)
{       sum = 0;

        for (k = 1; k < floor(L/2); k++)
        {       sum += ( X[k] * cos(2*pi*k*r/L) );
                sum += ( Y[k] * sin(2*pi*k*r/L) );
        }

        if (sum > max) { max = sum; r_star = r; }
}
```

FIG. 4

```
max = 0; r_star = 0

for (k = 1; k < floor(L/2); k++)
{               X[k] = (a[n][k]*a[n+1][k]) + (b[n][k]*b[n+1][k]);
                Y[k] = (b[n][k]*a[n+1][k]) - (a[n][k]*b[n+1][k]);
}

for (r = 0; r <= floor(L/2); r += rstep)
{       sum1 = 0; sum2 = 0;

        for (k = 1; k < floor(L/2); k++)
        {       c = cos(2*pi*k*r/L);
                s = sin(2*pi*k*r/L);

                sum1 += ( (X[k] * c) + (Y[k] * s) );
                sum2 += ( (X[k] * c) – (Y[k] * s) );
        }

        if (sum1 > max) { max = sum1; r_star = r; }
        if (sum2 > max) { max = sum2; r_star = L - r; }
}
```

FIG. 5

SYSTEMS, METHODS, AND APPARATUS FOR COMPUTATIONALLY EFFICIENT, ITERATIVE ALIGNMENT OF SPEECH WAVEFORMS

RELATED APPLICATIONS

This application claims benefit of U.S. Provisional Pat. Appl. No. 60/742,116, entitled "COMPLEXITY REDUCTION IN FREQUENCY DOMAIN ALIGNMENT CALCULATION," filed Dec. 2, 2005.

FIELD

This disclosure relates to signal processing.

BACKGROUND

Prototype waveform encoding schemes typically include an operation of prototype alignment to support a smoothly evolving waveform. Such alignment may be calculated as a series of cross-correlations in the time domain or in the frequency domain.

SUMMARY

A method of aligning two periodic speech waveforms includes the following acts for each of a first plurality of phase shifts within a range: (1) evaluating at least one trigonometric function for each of a plurality of angles based on the phase shift; and (2) based on the evaluated trigonometric functions, calculating first and second correlation measures. The first correlation measure is a measure of a correlation between (A) a first one of the two periodic speech waveforms, as shifted by the phase shift, and (B) a second one of the two periodic speech waveforms. The second correlation measure is a measure of a correlation between (C) the first one of the two periodic speech waveforms, as shifted by a phase shift outside the range, and (D) the second one of the two periodic speech waveforms.

An apparatus configured to align two periodic speech waveforms includes means for evaluating, for each of a first plurality of phase shifts within a range, at least one trigonometric function for each of a plurality of angles based on the phase shift. This apparatus also includes means for calculating, for each of the first plurality of phase shifts, (1) a first correlation measure based on the evaluated trigonometric functions of angles based on the phase shift and (2) a second correlation measure based on the evaluated trigonometric functions of angles based on the phase shift. The first correlation measure is a measure of a correlation between (A) a first one of the two periodic speech waveforms, as shifted by the phase shift, and (B) a second one of the two periodic speech waveforms. The second correlation measure is a measure of a correlation between (C) the first one of the two periodic speech waveforms, as shifted by a phase shift outside the range, and (D) the second one of the two periodic speech waveforms.

Another apparatus configured to align two periodic speech waveforms includes a trigonometric function evaluator configured to evaluate, for each of a first plurality of phase shifts within a range, at least one trigonometric function for each of a plurality of angles based on the phase shift. This apparatus also includes a calculator configured to calculate, for each of the first plurality of phase shifts, (1) a first correlation measure based on the evaluated trigonometric functions of angles based on the phase shift and (2) a second correlation measure based on the evaluated trigonometric functions of angles based on the phase shift. The first correlation measure is a measure of a correlation between (A) a first one of the two periodic speech waveforms, as shifted by the phase shift, and (B) a second one of the two periodic speech waveforms. The second correlation measure is a measure of a correlation between (C) the first one of the two periodic speech waveforms, as shifted by a phase shift outside the range, and (D) the second one of the two periodic speech waveforms.

BRIEF DESCRIPTION OF THE DRAWINGS

FIG. 2 shows an example of a pseudocode listing for a method of aligning two periodic speech waveforms.

FIG. 3 shows an example of a pseudocode listing for an implementation of alignment task T400.

FIG. 4 shows an example of a pseudocode listing for another implementation of an alignment task.

FIG. 5 shows an example of a pseudocode listing for another implementation of alignment task T400.

DETAILED DESCRIPTION

Figure 1:
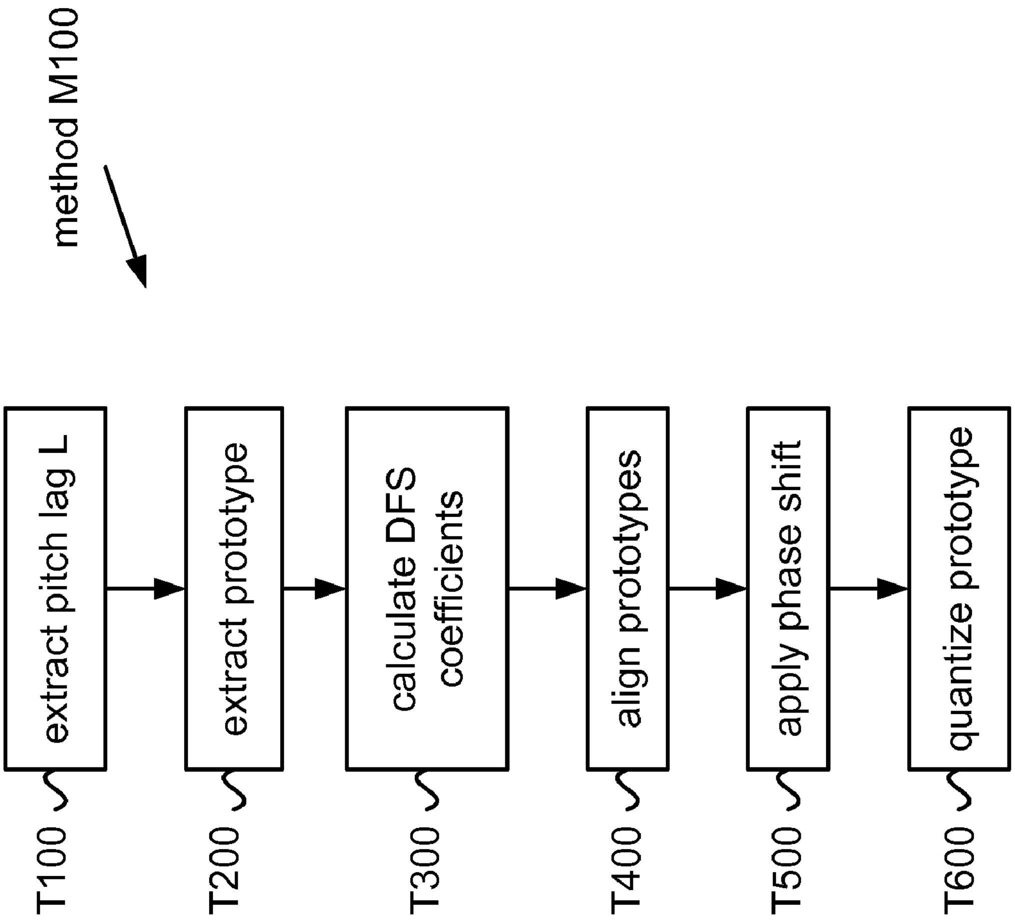
FIG. 1 shows a flowchart for a method M100 according to one configuration.

Most existing speech coders include an operation in which a speech frame is decomposed into a set of linear predictive coding (LPC) coefficients and a residual. As coding of the residual occupies much of the encoded signal stream, various schemes have been developed to reduce the bit rate needed to code the residual.

For unvoiced speech segments such as fricatives, a random noise may be substituted for all or part of the residual. For voiced speech segments such as vowels, the residual signal exhibits a high degree of periodicity, which implies that at least some samples may be interpolated. In fact, using a coding technique such as code-excited linear prediction (CELP) to encode a voiced speech segment at a low quantization rate may fail to preserve the level of periodicity.

Coding schemes that may be used for storage or transmission of voiced speech segments at low bit rates include prototype pitch period (PPP) coders and prototype waveform interpolation (PWI) coders. Such coding schemes periodically locate a prototype waveform having a length of one pitch period in the residual signal. At the decoder, the residual signal is interpolated for periods between the prototypes to obtain an approximation of the original highly periodic waveform.

Typically periodicity is strong only during strongly voiced segments, such that a pitch period may not even exist for less strongly voiced or unvoiced modes of speech. Using a PPP or PWI coder to encode all segments of a speech signal, including non-periodic speech segments, is likely to give a poor overall result. One solution is to use different coding schemes for voiced and unvoiced speech. For example, a PPP or PWI scheme may be used for voiced segments and a CELP scheme may be used for unvoiced segments. Switching between the coding schemes may be performed according to a measure of periodicity in the speech signal, which may be computed using zero crossings or normalized autocorrelation functions.

Another solution is to extend a PWI scheme to a waveform interpolation (WI) scheme. In a WI coding scheme, the prototype waveform, now called a representative or characteristic waveform, is decomposed into a smoothly evolving waveform (SEW) and a rapidly evolving waveform (REW). The SEW models pitch-related components while the REW models components that vary more rapidly. These two waveforms typically have very different perceptual requirements and may be separately quantized.

Unless explicitly stated otherwise, the terms "prototype" and "prototype waveform" are used herein to include any periodic speech waveform, such as a waveform including at least a slowly evolving waveform (SEW). Other terms that may be used for such waveforms are "characteristic waveforms" and "representative waveforms," which are sometimes used to indicate waveforms that may include both an SEW and an REW. Thus it will be understood that application of principles described herein to PPP, PWI, and WI coding schemes is expressly contemplated and hereby disclosed.

FIG. 1 shows a method M100 of encoding a residual signal for a speech frame. A frame is a segment of a speech signal that is short enough such that its long-term spectral characteristics are relatively stationary. A typical frame length is 20 milliseconds. Task T100 extracts a pitch lag value (or "pitch period") L for the frame. This operation is also called "pitch estimation." For a speech signal sampled at 8 kHz, the pitch lag value is typically in the range of from about 20 to about 120 (corresponding to fundamental frequencies of 400 Hz and 67 Hz, respectively).

Task T100 may include determining an average distance between samples having the largest absolute value in the residual signal. Alternatively, task T100 may be configured to determine the delay that maximizes the autocorrelation of a frame or window, such as a window twice as large as the candidate pitch period (e.g., the pitch period of the preceding frame). The result of this autocorrelation operation may also be used to support a decision as to whether the frame is voiced or unvoiced. In some cases (especially for WI coding schemes), task T100 may include a check for local maxima around L/2 and L/3 samples to avoid pitch doubling or tripling. It may be possible to reduce pitch doubling or tripling by performing pitch estimation on a signal having a higher sampling rate (e.g., on a signal that is resampled from 8 kHz to 16 kHz).

Task T200 extracts a prototype of length L from the residual frame. Task T200 is typically configured to extract the prototype from the final pitch period of the frame. It may be desirable to ensure that high-energy regions of the residual do not occur at the beginning or end of the prototype, as such placement could cause discontinuities between adjacent prototypes. In one example, task T200 is configured to extract the prototype such that the sum of energies at the beginning and end of the prototype is minimized. In another example, task T200 is configured to extract the prototype such that a distance from the sample within the prototype which has the highest magnitude (i.e., the dominant spike) to either end of the prototype is not less than a particular number of samples (e.g., six) or a particular proportion of L (e.g., 25%).

It is also possible to configure task T200 to extract more than one prototype per frame. In a WI coding scheme, for example, it may be desirable to extract up to eight or more prototypes per frame. In this case, it may be desirable to obtain more frequent pitch estimates as well. In some cases, pitch extraction is performed once or twice per frame, and additional pitch values (for a total of, e.g., eight values per frame) are interpolated between the extracted pitch values using a method such as linear interpolation (for pitch values that are close in value) and/or stepwise interpolation (when the difference between adjacent pitch values is large).

An extracted prototype s is typically expressed in the time domain as a sequence s[n] of length L, where sample index n∈[0, L−1] and L is the pitch period. A prototype may also be expressed in the frequency domain as a periodic signal of period L. Using a discrete Fourier series (DFS) representation, for example, a prototype s may be expressed as a sum of harmonics of the fundamental frequency 1/L each weighted by a respective pair of spectral or DFS coefficients a[k], b[k]:

$$s(n) = \sum_{k=0}^{\lfloor L/2 \rfloor} \left[ a[k]\cos\left(\frac{2\pi kn}{L}\right) + b[k]\sin\left(\frac{2\pi kn}{L}\right) \right]. \tag{1}$$

In this expression, k is an index indicating the k-th harmonic of the fundamental frequency, where the harmonics in the prototype s range from the zeroth harmonic (k=0, indicating the DC component) and the first harmonic (k=1, indicating the fundamental frequency) up to the ⌊L/2⌋-th harmonic (k=⌊L/2⌋, indicating the highest harmonic of the fundamental frequency in the prototype). In expression (1), as in the time-domain representation, the sample index n has the range 0≦n<(L−1). In the frequency-domain representation of expression (1), however, n need not be an integer value, such that expression (1) may be used to evaluate s at fractional values of n.

Method M100 includes a task T300 that calculates a set of DFS coefficients. For example, task T300 may be configured to calculate the DFS coefficients a[k], b[k] according to the following expressions:

$$a[k] = z[k]\sum_{n=0}^{L-1} s[n]\cos\left(\frac{2\pi kn}{L}\right), \tag{2a}$$

$$b[k] = z[k]\sum_{n=0}^{L-1} s[n]\sin\left(\frac{2\pi kn}{L}\right), \tag{2b}$$

where z[0] equals 1/L, z[L/2] equals 1/L for even L, and z[k] equals 2/L otherwise.

In expression (1), the coefficient b[0] is redundant because for k=0, $$\sin\left(\frac{2\pi kn}{L}\right)$$

is zero. The coefficient a[0] may also be ignored because it represents the DC component of the prototype, which is perceptually irrelevant. Thus task T300 may be configured to calculate the DFS coefficients for the range k∈[1, ⌊L/2⌋], and expression (1) may be simplified as follows:

$$s(n) = \sum_{k=1}^{\lfloor L/2 \rfloor} \left[ a[k]\cos\left(\frac{2\pi kn}{L}\right) + b[k]\sin\left(\frac{2\pi kn}{L}\right) \right]. \tag{3}$$

It is desirable for the waveform to evolve smoothly from one prototype to the next. To support a smooth interpolation between the prototypes, it is desirable to align adjacent prototypes. For example, it may be desirable to align a prototype for the current frame to a reference such as a prototype of a previous frame. Such alignment may also support more efficient quantization of the prototypes. For the reference prototype, it is typically desirable to use a decoded (e.g., dequantized) prototype as would be seen at the decoder.

Prototype alignment may be performed in the time domain or in the frequency domain. In the time domain, prototype alignment may be performed by identifying the time shift x* that yields the maximum cross-correlation of one prototype to a circularly rotated, time-shifted version of the other prototype:

$$x^* = \underset{x}{\operatorname{argmax}} \sum_{n=0}^{L-1} s^c[n] s^r[(n+x) \bmod L] \tag{4}$$

where x is the time shift (measured in samples), $s^c$ denotes the current prototype, and $s^r$ denotes the reference prototype. The identified shift x* may then be applied to the reference prototype so that the features of the two prototypes are time-aligned. In this example, the reference prototype is shifted relative to the current prototype, although in other examples the operation is configured such that the time shifts x are applied instead to the current prototype.

It may be desirable to perform prototype alignment in the frequency domain instead, such that the prototypes are aligned in phase rather than in time. For example, alignment of prototypes of different length may be accomplished more easily in the frequency domain, as performing such an operation in the time domain may require time-warping to match the length of one prototype to the other. It is also possible that a reduction in computational complexity may be achieved by performing the alignment operation in the frequency-domain, especially for fractional phase shifts.

In the frequency domain, the alignment operation may be performed by identifying the phase shift r* that yields the maximum cross-correlation of one prototype to a phase-shifted version of the other prototype:

$$r^* = \underset{0 \leq r < L}{\operatorname{argmax}} \sum_{k=1}^{\lfloor L/2 \rfloor} \left[ \begin{array}{l} (a_n[k]a_{n+1}[k] + b_n[k]b_{n+1}[k])\cos\left(\frac{2\pi kr}{L}\right) + \\ (b_n[k]a_{n+1}[k] - a_n[k]b_{n+1}[k])\sin\left(\frac{2\pi kr}{L}\right) \end{array} \right], \tag{5}$$

where $a_n[k]$, $b_n[k]$ indicate the DFS coefficients for the reference prototype and $a_{n+1}[k]$, $b_{n+1}[k]$ indicate the DFS coefficients for the current prototype. The cross-correlation is repeated for values of r in the alignment range $0 \leqq r < L$ (which values may be fractional) to determine the phase shift r* for which the correlation between the prototypes is maximized. FIG. 2 shows one example of a pseudocode listing that may be used to perform a calculation of expression (5).

Although calculation of the alignment in the frequency domain may yield certain advantages over such calculation in the time-domain, nevertheless the evaluation of expression (5) for each pair of prototypes to be aligned is computationally intensive and may represent a significant portion of the overall computational burden in a prototype coding system.

Calculation of expression (5) may be performed over the alignment range $0 \leqq r < L$ at a desired phase sampling rate. Alternatively, a PWI encoder may be configured to apply a recursive scheme in which a first series of shifts is performed at a coarse resolution but over the entire alignment range. At each level of the recursion, the identified shift is provided as a parameter to the next level, which performs another series of shifts at a finer resolution but over a smaller alignment range including the identified shift. The recursion ends when the series of shifts at the target resolution is completed. Such a scheme may be unsuitable for voiced speech, however, as it is more likely to find a local correlation maximum than a global one.

Method M100 is configured to perform an efficient alignment by a different technique, although further implementations of method M100 that also include such recursion are expressly contemplated and hereby disclosed. According to one type of implementation of this technique, task T400 calculates an alignment between the prototypes such that cross-correlations for two different phase shifts are performed for a single set of evaluated cosines and sines. Such a technique may be applied to reduce the number of trigonometric function evaluations for a prototype alignment operation by about one-half as compared to an operation described by expression (5).

Task T400 is configured to use each set of evaluated cosines and sines to calculate prototype cross-correlations for two different phase shift values r in the alignment range $0 \leqq r < L$ (with the possible exception of sets corresponding to angles of 0 or π radians). One explanation of the development of this technique begins with the following modification of expression (5):

$$r^* = \underset{\{x \in \{r, L-r\}: 0 \leq r \leq \lfloor L/2 \rfloor\}}{\operatorname{argmax}} \left( \sum_{k=1}^{\lfloor L/2 \rfloor} \left[ \begin{array}{l} (a_n[k]a_{n+1}[l] + b_n[k]b_{n+1}[k])\cos\left(\frac{2\pi kx}{L}\right) + \\ (b_n[k]a_{n+1}[k] - a_n[k]b_{n+1}[k])\sin\left(\frac{2\pi kx}{L}\right) \end{array} \right] \right) \tag{6}$$

In expression (6), correlations for phase shifts of r and L−r are paired. (It will be understood that such pairing is equivalent to pairing phase shifts of +r and −r.) With application of the following trigonometric identities, a relation between the cosines and sines of these paired phase shifts may be exploited:

$$\cos(u-v) = \cos u \cos v + \sin u \sin v, \tag{7a}$$

$$\sin(u-v) = \sin u \cos v - \cos u \sin v. \tag{7b}$$

Combining these identities with the equations $$\frac{2\pi k(L-r)}{L} = 2\pi k - \frac{2\pi kr}{L}, \text{ and}$$

$\cos(2\pi k)=1$ and $\sin(2\pi k)=0$ for integer k, it may be established that $$\cos\left(\frac{2\pi k(L-r)}{L}\right) = \cos\left(\frac{2\pi kr}{L}\right), \tag{8a}$$

$$\sin\left(\frac{2\pi k(L-r)}{L}\right) = -\sin\left(\frac{2\pi kr}{L}\right). \tag{8b}$$

Results (8a) and (8b) may be used to modify expression (6) as follows. For each value of r in the evaluation range $0 \leqq r \leqq \lfloor L/2 \rfloor$, the same cosine and sine values are used to compute the following two expressions (9A) and (9B), and the expression yielding the maximum result is identified:

$$\sum_{k=1}^{\lfloor L/2\rfloor}\left[\begin{array}{l}(a_n[k]a_{n+1}[k]+b_n[k]b_{n+1}[k])\cos\left(\frac{2\pi kr}{L}\right)+\\(b_n[k]a_{n+1}[k]-a_n[k]b_{n+1}[k])\sin\left(\frac{2\pi kr}{L}\right)\end{array}\right]; \tag{9A}$$

$$\sum_{k=1}^{\lfloor L/2\rfloor}\left[\begin{array}{l}(a_n[k]a_{n+1}[k]+b_n[k]b_{n+1}[k])\cos\left(\frac{2\pi kr}{L}\right)-\\(b_n[k]a_{n+1}[k]-a_n[k]b_{n+1}[k])\sin\left(\frac{2\pi kr}{L}\right)\end{array}\right]. \tag{9B}$$

If the expression yielding the maximum result is one of the expressions (9A), then r* is assigned the value r. If the expression yielding the maximum result is one of the expressions (9B), then r* is assigned the value −r. It may be seen that the set of evaluated cosines and sines for each value of r in expressions (9A-B) is thus used to calculate cross-correlations for two different phase shift values (except in cases where r=0 or r=L/2, where the phase shift values in expressions (9A) and (9B) are equal). In this or a similar manner, task T400 is configured to use each set of evaluated cosines and sines over a phase shift evaluation range $0\leqq r\leqq\lfloor L/2\rfloor$ (except for sets corresponding to r=0 or r=L/2) to calculate prototype cross-correlations for two different phase shift values r in the alignment range $0\leqq r<L$. FIG. 3 shows one example of a pseudocode listing that may be used by an implementation of task T400 to perform a calculation of expression (9).

It may be desirable to perform spectral weighting on the prototypes before alignment. For example, it may be desirable to restore some of the formant structure using the LPC coefficients, possibly with some de-emphasis at the formant frequencies. In one such implementation, task T400 is configured to zero-pad the current prototype to length 2L, to filter this signal by a weighted LPC synthesis filter with zero memory (e.g., using the LPC coefficients of the last subframe of the current frame), and to obtain a perceptually weighted prototype of length L by adding the n-th sample of the filtered signal to the (n+L)-th sample for $0\leqq n<L$.

Cross-correlation maximization expressions (4), (5), (6), and (9) above assume that the prototypes are of equal length. In the frequency domain, two prototypes of unequal length may be normalized by spectrally truncating the longer prototype and/or by zero-padding the shorter prototype. In a WI coding scheme, it may occur that one prototype has a length that is approximately double or triple the length of the other prototype (e.g., because of pitch doubling or tripling). In such case, the shorter prototype may be periodically extended by insertion of zero-amplitude harmonics. Task T400 may be configured to perform one or more such length normalization operations before prototype alignment.

In expressions (5), (6), and (9) above, it may be noted that these expressions all include, for each harmonic component of the prototypes, multiplying each evaluated cosine by the same factor based on the DFS coefficients of the prototypes and multiplying each evaluated sine by the same factor based on the DFS coefficients of the prototypes. A further reduction in computational complexity may be achieved by precomputing these factors and storing them (e.g., as factors $X_k$ and $Y_k$). In such manner, expression (5) may be simplified as follows:

$$r^*=\underset{0\leq r<L}{\operatorname{argmax}}\sum_{k=1}^{\lfloor L/2\rfloor}\left[X_k\cos\left(\frac{2\pi kr}{L}\right)+Y_k\sin\left(\frac{2\pi kr}{L}\right)\right]. \tag{10}$$

FIG. 4 shows one example of a pseudocode listing for a prototype alignment task that employs a reduction according to expression (10).

Likewise, precomputation of factors $X_k$ and $Y_k$ may be used to simplify expressions (9A-B) as follows:

$$\sum_{k=1}^{\lfloor L/2\rfloor}\left[X_k\cos\left(\frac{2\pi kr}{L}\right)+Y_k\sin\left(\frac{2\pi kr}{L}\right)\right]; \tag{11A}$$

$$\sum_{k=1}^{\lfloor L/2\rfloor}\left[X_k\cos\left(\frac{2\pi kr}{L}\right)-Y_k\sin\left(\frac{2\pi kr}{L}\right)\right]. \tag{11B}$$

FIG. 5 shows an example of a pseudocode listing for an implementation of task T400 that employs such a reduction.

Task T500 is configured to apply, to the current prototype, the phase shift corresponding to the maximum cross-correlation (e.g., r*). For example, task T500 may be configured to apply a circular rotation (e.g., of r* samples) to the prototype in the time domain or to rotate the prototype (e.g., by an angle of $$\frac{2\pi r^*}{L}$$

radians) in the frequency domain. Task T500 may also be configured to perform a spectral weighting operation (e.g., a perceptual weighting operation) on the aligned prototype.

Task T600 is configured to quantize the prototype (e.g., for efficient transmission and/or storage). Such quantization may include gain normalization of the prototype for separate quantization of power and shape. Additionally or alternatively, such quantization may include decomposition of the DFS coefficients into amplitude and phase vectors for separate quantization and/or subsampling. Such normalization and/or decomposition operations may support more efficient vector quantization, as the resulting vectors may be more highly correlated to such vectors of other prototypes of the speech signal.

In a further implementation of method M100, task T400 is configured to perform the prototype alignment separately on different frequency bands of the prototypes, such that a different phase shift may be obtained for each of the different frequency bands. In this case, task T500 may be configured to apply the respective phase shifts to the harmonic components of the prototype within the corresponding band, and task T600 may be configured to subsample the phase vector of the prototype according to the frequency band division (e.g., such that one phase value is encoded for each frequency band).

In a WI coding scheme, a filter bank (e.g., including a highpass and a lowpass filter) may be applied to the aligned prototype to separate the SEW and the REW for further processing and/or separate quantization.

Figure 6:
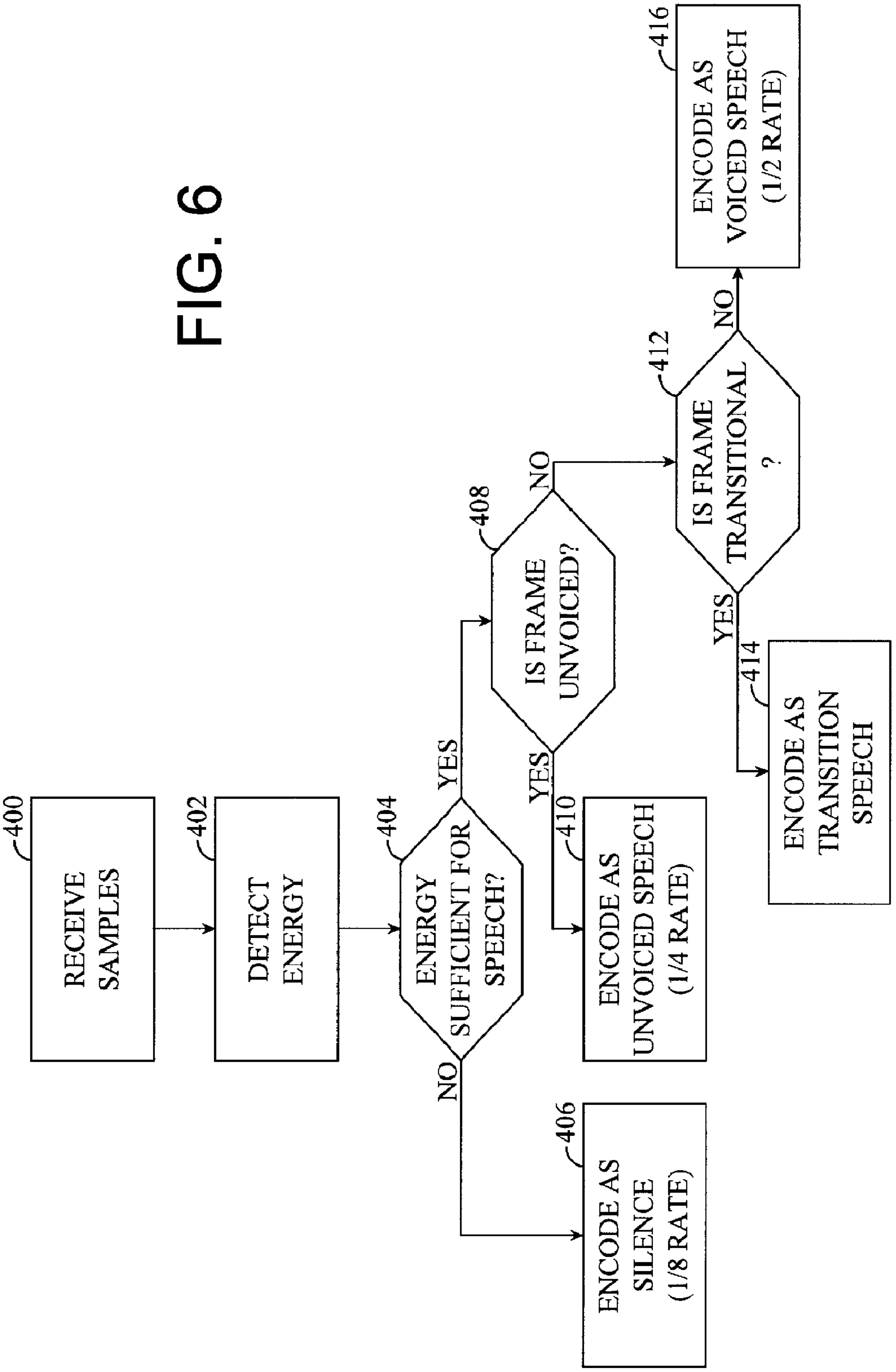
FIG. 6 shows a diagram of a coding mode selection scheme.

FIG. 6 shows a flowchart of operations, including coding mode selection, as may be performed by one example of a speech coder configured to process speech samples for transmission. In task 400, the speech coder receives digital samples of a speech signal in successive frames. Upon receiving a given frame, the speech coder proceeds to task 402. In task 402, the speech coder detects the energy of the frame. The energy is a measure of the speech activity of the frame. Speech detection is performed by summing the squares of the amplitudes of the digitized speech samples and comparing the resultant energy against a threshold value. Task 402 may be configured to adapt this threshold value based on the changing level of background noise. An exemplary variable threshold speech activity detector is described in U.S. Pat. No. 5,414,796 (Jacobs et al., issued May 9, 1995). Some unvoiced speech sounds can be extremely low-energy samples that may be mistakenly encoded as background noise. To reduce the chance of such an error, the spectral tilt (e.g., the first reflection coefficient) of low-energy samples may be used to distinguish the unvoiced speech from background noise, as described in the aforementioned U.S. Pat. No. 5,414,796.

After detecting the energy of the frame, the speech coder proceeds to task 404. In task 404, the speech coder determines whether the detected frame energy is sufficient to classify the frame as containing speech information. If the detected frame energy falls below a predefined threshold level, the speech coder proceeds to task 406. In task 406, the speech coder encodes the frame as background noise (i.e., silence). In one configuration the background noise frame is encoded at ⅛ rate, or 1 kbps. If in task 404, the detected frame energy meets or exceeds the predefined threshold level, the frame is classified as speech and the speech coder proceeds to task 408.

In task 408, the speech coder determines whether the frame is unvoiced speech. For example, task 408 may be configured to examine the periodicity of the frame. Various known methods of periodicity determination include, e.g., the use of zero crossings and the use of normalized autocorrelation functions (NACFs). In particular, using zero crossings and NACFs to detect periodicity is described in U.S. Pat. No. 5,911,128 (DeJaco, issued Jun. 8, 1999) and U.S. Pat. No. 6,691,084 (Manjunath et al., issued Feb. 10, 2004). In addition, the above methods used to distinguish voiced speech from unvoiced speech are incorporated into the Telecommunication Industry Association Interim Standards TIA/EIA IS-127 and TIA/EIA IS-733. If the frame is determined to be unvoiced speech in task 408, the speech coder proceeds to task 410. In task 410, the speech coder encodes the frame as unvoiced speech. In one configuration, unvoiced speech frames are encoded at quarter rate, or 2.6 kbps. If the frame is not determined to be unvoiced speech in task 408, the speech coder proceeds to task 412.

In task 412, the speech coder determines whether the frame is transitional speech. Task 412 may be configured to use periodicity detection methods that are known in the art (for example, as described in U.S. Pat. No. 5,911,128). If the frame is determined to be transitional speech, the speech coder proceeds to task 414. In task 414, the frame is encoded as transition speech (i.e., transition from unvoiced speech to voiced speech). In one configuration, the transition speech frame is encoded in accordance with a multipulse interpolative coding method described in U.S. Pat. No. 6,260,017 (Das et al., issued Jul. 10, 2001). A CELP scheme may also be used to code transition speech frames. In another configuration, the transition speech frame is encoded at full rate, or 13.2 kbps.

If in task 412, the speech coder determines that the frame is not transitional speech, the speech coder proceeds to task 416. In task 416, the speech coder encodes the frame as voiced speech. In one configuration, voiced speech frames may be encoded at half rate (e.g., 6.2 kbps), or at quarter rate, using a PPP coding scheme or other prototype coding scheme as described herein. It is also possible to encode voiced speech frames at full rate using a PPP or other coding scheme (e.g., 13.2 kbps, or 8 kbps in an 8 k CELP coder). Those skilled in the art would appreciate, however, that coding voiced frames at half or quarter rate allows the coder to save valuable bandwidth by exploiting the steady state nature of voiced frames. Further, regardless of the rate used to encode the voiced speech, the voiced speech is advantageously coded using information from past frames, and is hence said to be coded predictively.

Figure 7B:
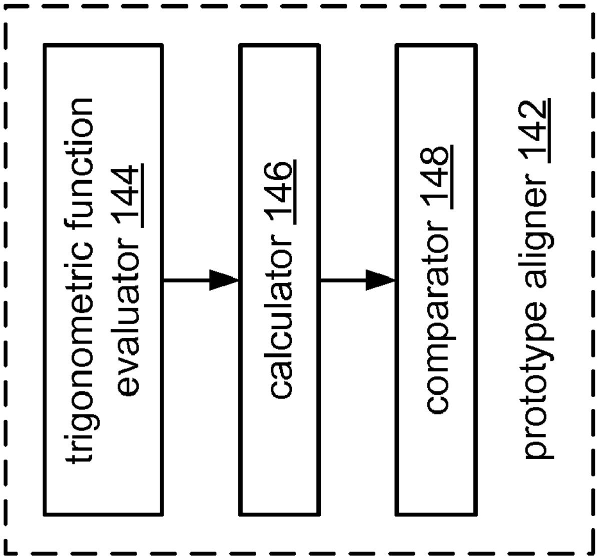
FIG. 7B shows a block diagram of an implementation 142 of prototype aligner 140.
Figure 7A:
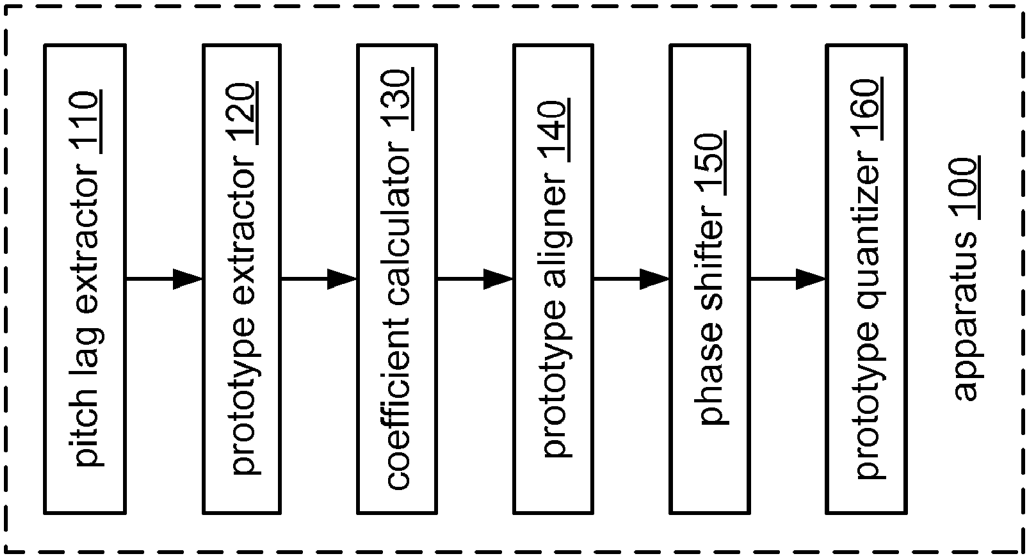
FIG. 7A shows a block diagram of an apparatus 100 according to a disclosed configuration.

FIG. 7A shows a block diagram for an apparatus 100 according to a disclosed configuration that may be used in a speech coder, cellular telephone, or other apparatus for speech encoding and/or communications. Apparatus 100 includes a pitch lag extractor 110 configured to extract a pitch lag value (or “pitch period”) L for the frame. For example, pitch lag extractor 110 may be arranged to receive a residual signal from a linear prediction (LP) analysis module, which is configured to decompose a frame of a speech signal into a set of LPC coefficients and the residual signal. Pitch lag extractor 110 may be configured to perform an implementation of task T100 as described herein on the residual signal. In one example, pitch lag extractor 110 is configured to extract the pitch period by determining an average distance between samples having the largest absolute value in the residual signal. Alternatively, pitch lag extractor 110 may be configured to determine the delay that maximizes the autocorrelation of a frame or window, such as a window twice as large as the candidate pitch period (e.g., the pitch period of the preceding frame). The result of this autocorrelation operation may also be used to support a decision as to whether the frame is voiced or unvoiced. In some cases (especially for WI coding schemes), pitch lag extractor 110 may be configured to check for local maxima around L/2 and L/3 samples (e.g., to avoid pitch doubling or tripling).

Apparatus 110 includes a prototype extractor 120 configured to extract a prototype of length L from the residual frame (e.g., according to an implementation of task T200 as described herein). Prototype extractor 120 is typically configured to extract the prototype from the final pitch period of the frame. In one example, prototype extractor 120 is configured to extract the prototype such that the sum of energies at the beginning and end of the prototype is minimized. In another example, prototype extractor 120 is configured to extract the prototype such that a distance from the sample within the prototype which has the highest magnitude (i.e., the dominant spike) to either end of the prototype is not less than a particular number of samples (e.g., six) or a particular proportion of L (e.g., 25%).

Prototype extractor 120 may also be configured to extract more than one prototype per frame. In a WI coding scheme, for example, it may be desirable for prototype extractor 120 to extract up to eight or more prototypes per frame. In this case, pitch lag extractor 110 may be configured to extract a pitch lag value once or twice per frame and to interpolate additional pitch values (for a total of, e.g., eight values per frame) between the extracted pitch values using a method such as linear interpolation (for pitch values that are close in value) and/or stepwise interpolation (when the difference between adjacent pitch values is large).

Apparatus 100 includes a coefficient calculator 130 configured to calculate a set of spectral coefficients (e.g., DFS coefficients). For example, coefficient calculator 130 may be configured to calculate a set of DFS coefficients corresponding to harmonics of the fundamental frequency 1/L according to expressions (2a) and (2b) above. It may be desirable for coefficient calculator 130 to be configured to calculate a pair of coefficients a[k], b[k] for each k in the range $k \in [1, \lfloor L/2 \rfloor]$.

Apparatus 100 includes a prototype aligner 140 configured to calculate an alignment between two prototypes (e.g., a prototype of the current frame and a prototype of a previous frame) according to an implementation of task T400 as described herein. For example, prototype aligner 140 may be configured to calculate an alignment between the prototypes such that cross-correlations for two different phase shifts are performed for a single set of evaluated cosines and sines.

Prototype aligner 140 may be configured to use each set of evaluated cosines and sines (with the possible exception of sets corresponding to angles of 0 or π radians) to calculate prototype cross-correlations for two different phase shifts r in the alignment range $0 \leqq r < L$ For example, prototype aligner 140 may be configured to use each set of evaluated cosines and sines over a phase shift evaluation range $0 \leqq r \leqq \lfloor L/2 \rfloor$ (except for sets corresponding to r=0 or r=L/2) to calculate prototype cross-correlations for two different phase shift values r in the alignment range $0 \leqq r < L$. Prototype aligner 140 may be configured to perform such operations according to either of the pseudocode listings shown in FIG. 3 and FIG. 5.

FIG. 7B shows a block diagram of an implementation 142 of prototype aligner 140. Trigonometric function evaluator 144 is configured to evaluate, for each of a plurality of first phase shifts within an evaluation range (e.g., $0 \leqq r \leqq \lfloor L/2 \rfloor$), at least one trigonometric function for each of a plurality of angles based on the first phase shift. Calculator 146 is configured to calculate, for each of the plurality of first phase shifts, first and second correlation measures between the two prototypes. The first correlation measure corresponds to one of the prototypes being shifted by the first phase shift (e.g., r) relative to the other. The second correlation measure corresponds to one of the prototypes being shifted relative to the other by a phase shift outside the evaluation range (e.g., −r or L−r). Comparator 148 is configured to identify the maximum among the first and second correlation measures.

It may be desirable for prototype aligner 140 to perform spectral weighting on the prototypes before alignment. In one such implementation, prototype aligner 140 is configured to zero-pad the current prototype to length 2L, to filter this signal by a weighted LPC synthesis filter with zero memory (e.g., using the LPC coefficients of the last subframe of the current frame), and to obtain a perceptually weighted prototype of length L by adding the n-th sample of the filtered signal to the (n+L)-th sample for $0 \leqq n < L$. Prototype aligner 140 may also be configured to perform one or more length normalization operations as described herein on one or more of the prototypes before calculating the alignment.

Apparatus 100 includes a phase shifter 150 configured to apply, to the current prototype, the phase shift corresponding to the maximum cross-correlation identified by prototype aligner 140 (e.g., r*). For example, phase shifter 150 may be configured to apply a circular rotation (e.g., of r* samples) to the prototype in the time domain or to rotate the prototype (e.g., by an angle of $$\frac{2\pi r^*}{L}$$

radians) in the frequency domain. Phase shifter 150 may also be configured to perform a spectral weighting operation, such a perceptual weighting operation, on the aligned prototype (e.g., by applying a filter such as a perceptual weighting filter to the aligned prototype).

Apparatus 100 includes a prototype quantizer 160 configured to quantize the prototype (e.g., for efficient transmission and/or storage). Such quantization may include gain normalization of the prototype for separate quantization of power and shape. Additionally or alternatively, such quantization may include decomposition of the DFS coefficients into amplitude and phase vectors for separate quantization. Prototype quantizer 160 may be configured to perform quantization of amplitudes and phases according to any of the following methods: scalar quantization of each component, vector quantization of sets of components, muti-stage quantization (vector, scalar, or mixed), joint quantization of amplitudes and phases in pairs or sets of pairs.

In a further implementation of apparatus 100, prototype aligner 140 is configured to perform the prototype alignment separately on different frequency bands of the prototypes, such that a different phase shift may be obtained for each of the different frequency bands. In this case, phase shifter 150 may be configured to apply the respective phase shifts to the harmonic components of the prototype within the corresponding band, and prototype quantizer 160 may be configured to subsample the phase vector of the prototype according to the frequency band division (e.g., such that one phase value is encoded for each frequency band). Subsampling of phase and amplitude information and other aspects of PPP coding and decoding are discussed in, for example, U.S. Pat. No. 6,678,649 (Manjunath, issued Jan. 13, 2004).

For use in a WI coding scheme, apparatus 100 may be configured to include a filter bank (e.g., including a highpass and a lowpass filter) arranged to receive the aligned prototype from phase shifter 150 and to separate the SEW and the REW for further processing and/or separate quantization.

The various elements of implementations of apparatus 100 may be implemented as electronic and/or optical devices residing, for example, on the same chip or among two or more chips in a chipset, although other arrangements without such limitation are also contemplated. One or more elements of such an apparatus may be implemented in whole or in part as one or more sets of instructions arranged to execute on one or more fixed or programmable arrays of logic elements (e.g., transistors, gates) such as microprocessors, embedded processors, IP cores, digital signal processors, FPGAs (field-programmable gate arrays), ASSPs (application-specific standard products), and ASICs (application-specific integrated circuits).

It is possible for one or more elements of an implementation of apparatus 100 to be used to perform tasks or execute other sets of instructions that are not directly related to an operation of the apparatus, such as a task relating to another operation of a device or system in which the apparatus is embedded. It is also possible for one or more elements of an implementation of apparatus 100 to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The particular examples discussed above describe an alignment range of $0 \leqq r < L$, which corresponds to an angular range of 0 to 2π radians. However, it is expressly contemplated and hereby disclosed that a method of alignment as disclosed herein (e.g., task T400, a combination of task T400 and T500, or another method including task T400) may be configured generally to use a set of evaluated trigonometric functions (e.g., cosines and/or sines) to perform calculations for two different angular values over any range that is symmetric around L/2 (or around π radians). Likewise, a method of alignment as described herein may be configured generally to use a set of evaluated trigonometric functions to perform calculations for two different angular values over any portion of a larger range, where the portion is symmetric around L/2 (or around π radians).

Figure 8:
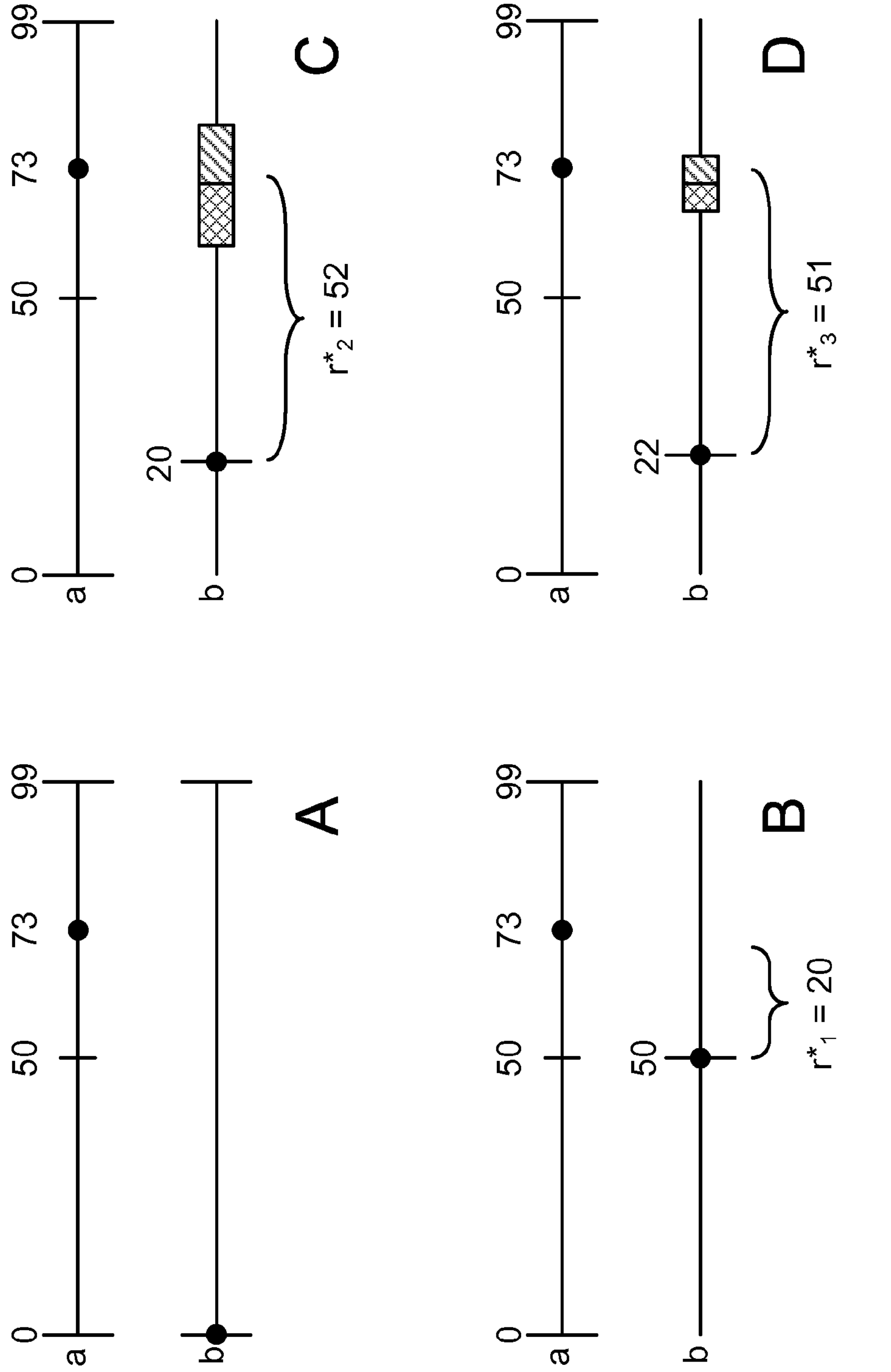
FIG. 8 shows an example of an application of implementations T410, T510 of tasks T400, T500, respectively.

FIG. 8 shows one example of an application of implementations T410, T510 of tasks T400, T500 that are arranged to perform a progressive alignment of two periodic waveforms (e.g., prototypes) at different alignment resolutions as discussed above. FIG. 8A shows a representation of the two waveforms a and b, where the value of L is 100 and the numerals indicate index values along a sample axis. For reference, the figures indicate that the phase shift r* which produces the maximum cross-correlation between the waveforms is 73. In other words, the waveforms are aligned when a shift of r*=73 is applied to waveform b.

In this method, tasks T410 and T510 are performed iteratively until the desired alignment resolution is achieved. In order to keep the alignment range centered around L/2, task T510 is arranged to shift one of the waveforms before each iteration of task T410.

Before the first iteration of task T410, task T510 applies a shift of L/2 (e.g., π radians) to one of the waveforms. FIG. 8B shows a representation of the two waveforms a and b after task T510 has performed a shift of L/2 on the waveform b. The first iteration of task T410 then calculates the correlations of waveforms a and b across the alignment range $0 \leqq r < L$ (with an evaluation range of $0 \leqq r \leqq \lfloor L/2 \rfloor$) at a first resolution (in this example, at a resolution of 10). As indicated in FIG. 8B, task T410 calculates a value of $r_1^*=20$ for this iteration.

Before the second iteration of task T410, task T510 applies an additional shift of $r_1^*+L/2$ (in this example, 70) to the waveform b as shown in FIG. 8B. FIG. 8C shows a representation of the two waveforms a and b after task T510 has performed this shift. The second iteration of task T410 then calculates the correlations of waveforms a and b across the reduced alignment range $$\frac{L}{2} - v_2 \le r < \frac{L}{2} + v_2,$$

as shown by the hatched area (with a reduced evaluation range of $$\frac{L}{2} - v_2 \le r \le \left\lfloor \frac{L}{2} \right\rfloor,$$

as shown by only the cross-hatched area), at a second resolution (in this example, $v_2=10$ and the second resolution is 2). As indicated in FIG. 8C, task T410 calculates a value of $r_2^* = 52$ for this iteration.

Before the third iteration of task T410, task T510 applies an additional shift of $r_2^* + L/2$ (in this example, 102) to the waveform b as shown in FIG. 8C. FIG. 8D shows a representation of the two waveforms a and b after task T510 has performed this shift. The third iteration of task T410 then calculates the correlations of waveforms a and b across the reduced alignment range $$\frac{L}{2} - v_3 \le r < \frac{L}{2} + v_3,$$

as shown by the hatched area (with a reduced evaluation range of $$\frac{L}{2} - v_3 \le r \le \left\lfloor \frac{L}{2} \right\rfloor,$$

as shown by only the cross-hatched area), at a third resolution (in this example, $v_3=5$ and the third resolution is 1). As indicated in FIG. 8D, task T410 calculates a value of $r_3^* = 51$ for this iteration.

In this example, the number of iterations is three, and task T410 is configured to calculate the final value of r* according to an expression such as the following:

$$r^* = \sum_i \left(r_i^* + \frac{L}{2}\right) \bmod \frac{L}{2}.$$

As described in this example, this expression for r* evaluates to 70+2+1, or 73. One of skill in the art will recognize that in an equivalent implementation of such a method, the preliminary phase shift of L/2 as described above may be omitted, with the expression for r* being modified as follows:

$$r^* = r_1^* + \sum_{i>1} \left(r_i^* + \frac{L}{2}\right) \bmod \frac{L}{2}.$$

Figure 9A:
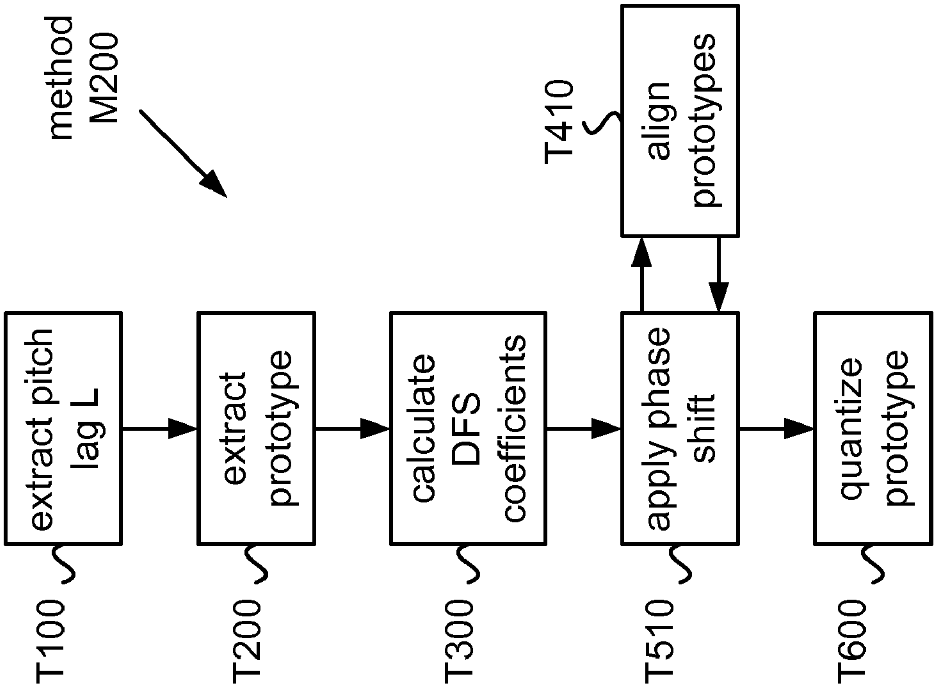
FIG. 9A shows a flowchart for an implementation M200 of method M100.
Figure 9B:
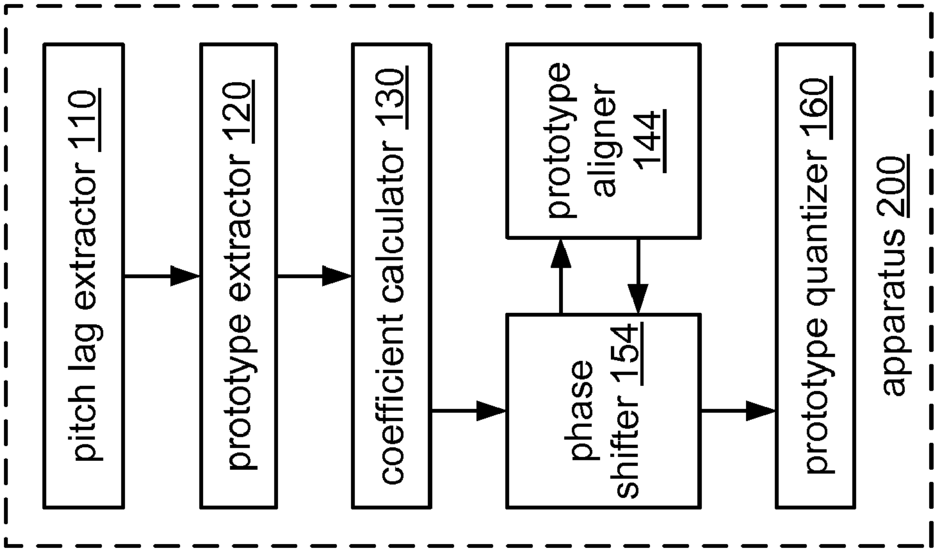
FIG. 9B shows a block diagram for an implementation 200 of apparatus 100.

FIG. 9A shows a flowchart of an implementation M200 of method M100 including implementations T410, T510 of tasks T400 and T500, respectively. FIG. 9B shows a block diagram of an implementation 200 of apparatus 100 that includes implementations 144, 154 of prototype aligner 140 and phase shifter 150 that are arranged to perform such an iterative method. It is understood that prototype aligner 144 may be implemented, for example, according to the implementation 142 shown in FIG. 7B. In such case, calculator 146 may be additionally configured to calculate the final value of r* as described above, or prototype aligner 144 and/or apparatus 200 may include another calculator so configured.

The foregoing presentation of the described configurations is provided to enable any person skilled in the art to make or use the methods and other structures disclosed herein. Various modifications to these configurations are possible, and the generic principles presented herein may be applied to other configurations as well. As may be appreciated from the context, for example, a configuration may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM (random-access memory), ROM (read-only memory), and/or flash RAM), or ferroelectric, magnetoresistive, ovonic, polymeric, or phase-change memory; or a disk medium such as a magnetic or optical disk. The term "software" should be understood to include source code, assembly language code, machine code, binary code, firmware, macrocode, microcode, any one or more sets or sequences of instructions executable by an array of logic elements, and any combination of such examples.

Each of the methods disclosed herein may also be tangibly embodied (for example, in one or more data storage media as listed above) as one or more sets of instructions readable and/or executable by a machine including an array of logic elements (e.g., a processor, microprocessor, microcontroller, or other finite state machine). Thus, the present disclosure is not intended to be limited to the configurations shown above but rather is to be accorded the widest scope consistent with the principles and novel features disclosed in any fashion herein, including in the attached claims as filed, which form a part of the original disclosure.

What is claimed is:

1. A method of aligning two periodic speech waveforms, under the control of an electronic device, said method comprising:

shifting a first one of two periodic speech waveforms by a non-zero value within an alignment range, prior to calculating a first and a second correlation measure;

evaluating a result of a trigonometric function of an angle, comprising evaluating a single cosine and a single sine;

(I) calculating the first correlation measure, between (A) the first one of two periodic speech waveforms, as shifted by a first phase shift, and (B) a second one of the two periodic speech waveforms using the result of the trigonometric function; and (II) calculating the second correlation measure, between (C) the first one of the two periodic speech waveforms, as shifted by a second phase shift, and (D) the second one of the two periodic speech waveforms using the result of the trigonometric function, wherein the first and second phase shifts are equal in magnitude and opposite in direction, wherein cross-correlations for multiple different phase shifts are determined using the single cosine and the single sine.

2. The method of aligning according to claim 1, further comprising generating a first and second plurality of correlation measures by performing calculations (I) and (II) for a plurality of phase shifts and applying, to the first one of the two periodic speech waveforms, the phase shift corresponding to an identified maximum among the first plurality of generated correlation measures and the second plurality of generated correlation measures.

3. The method of aligning according to claim 1, wherein said calculating a first correlation measure includes calculating a plurality of sums of (E) products of evaluated cosines and (F) products of the evaluated sines, and wherein said calculating a second correlation measure includes calculating a plurality of differences of (G) products of the evaluated cosines and (H) products of the evaluated sines.

4. The method of aligning according to claim 1, wherein the first one of the two periodic speech waveforms is based on a prototype waveform extracted from a residual of a first portion in time of a speech signal, and wherein the second one of the two periodic speech waveforms is based on a prototype waveform extracted from a residual of a second portion in time of the speech signal.

5. The method of aligning according to claim 4, wherein a length of each of the two periodic speech waveforms is equal to a pitch period of at least one of the first and second portions in time of the speech signal.

6. The method of aligning according to claim 4, wherein, the first phase shift is one of plurality of phase shifts, each of the plurality of phase shifts corresponds to a different harmonic frequency of the first periodic speech waveform.

7. The method of aligning according to claim 1, wherein the first phase shift is one of a plurality of phase shifts within the range of zero radians to π radians inclusive.

8. The method of aligning according to claim 1, wherein the second phase shift is one of a plurality of phase shifts within the range of π radians to 2π radians exclusive.

9. A non-transitory computer-readable storage medium encoded with machine-executable instructions configured to cause one or more processors to execute the method according to claim 1.

10. The computer-readable storage medium of claim 9, wherein said method comprises generating a first and second plurality of correlation measures by performing calculations (I) and (II) for a plurality of phase shifts, and applying, to the first one of the two periodic speech waveforms, the phase shift corresponding to the identified maximum among the first plurality of correlation measures and the second plurality of correlation measures.

11. The computer-readable storage medium of claim 9, wherein said calculating a first correlation measure includes calculating a plurality of sums of (E) products of evaluated cosines and (F) products of evaluated sines, and wherein said calculating a second correlation measure includes calculating a plurality of differences of (G) products of the evaluated cosines and (H) products of the evaluated sines.

12. The computer-readable storage medium of claim 9, wherein the first one of the two periodic speech waveforms is based on a prototype waveform extracted from a residual of a first portion in time of a speech signal, and wherein the second one of the two periodic speech waveforms is based on a prototype waveform extracted from a residual of a second portion in time of the speech signal.

13. The computer-readable storage medium of claim 12, wherein a length of each of the two periodic speech waveforms is equal to a pitch period of at least one of the first and second portions in time of the speech signal.

14. The computer-readable storage medium of claim 9, wherein the first phase shift is one of a plurality of phase shifts within the range of zero radians to π radians inclusive.

15. The computer-readable storage medium of claim 9, wherein the second phase shift is one of a plurality of phase shifts within the range of π radians to 2π radians exclusive.

16. An apparatus configured to align two periodic speech waveforms, said apparatus comprising:

means for shifting a first one of two periodic speech waveforms by a non-zero value within an alignment range, prior to calculating a first and a second correlation measure;

means for evaluating a result of a trigonometric function of an angle, comprising evaluating a single cosine and a single sine;

means for calculating, (1) the first correlation measure between (A) a first one of the two periodic speech waveforms, as shifted by a first phase shift, and (B) a second one of the two periodic speech waveforms using the result of the trigonometric function and (2) the second correlation measure between (C) the first one of the two periodic speech waveforms, as shifted by a second phase shift, and (D) the second one of the two periodic speech waveforms using the result of the trigonometric function, wherein cross-correlations for multiple different phase shifts are determined using the single cosine and the single sine.

17. The apparatus according to claim 16, wherein said apparatus comprises means for generating a first and second plurality of correlation measures using the means for calculating for a plurality of phase shifts and (i) applying, to the first one of the two periodic speech waveforms, the phase shift corresponding to an identified maximum among the first plurality of generated correlation measures and the second plurality of generated correlation measures.

18. The apparatus according to claim 16, wherein, said means for calculating is configured to calculate the first correlation measure to include a plurality of sums of (E) products of the evaluated cosines and (F) products of the evaluated sines, and wherein, for each of the first plurality of phase shifts, said means for calculating is configured to calculate the second correlation measure to include a plurality of differences of (G) products of the evaluated cosines and (H) products of the evaluated sines.

19. The apparatus according to claim 16, wherein said apparatus comprises a means for extracting a prototype waveform configured (i) to extract a first prototype waveform from a residual of a first portion in time of a speech signal and (ii) to extract a second prototype waveform from a residual of a second portion in time of the speech signal, wherein the first one of the two periodic speech waveforms is based on the first prototype waveform, and wherein the second one of the two periodic speech waveforms is based on the second prototype waveform.

20. The apparatus according to claim 19, wherein a length of each of the two periodic speech waveforms is equal to a pitch period of at least one of the first and second portions in time of the speech signal.

21. The apparatus according to claim 19, wherein, the first phase shift is one of a plurality of phase shifts, each of the plurality of phase shifts corresponds to a different harmonic frequency of the first prototype waveform.

22. The apparatus according to claim 16, wherein the first phase shift is one of a plurality of phase shifts within the range of zero radians to π radians inclusive.

23. The apparatus according to claim 16, wherein, the second phase shift is one of a plurality of phase shifts within the range of π radians to 2π radians exclusive.

24. A speech coder including the apparatus according to claim 16.

25. A cellular telephone including the apparatus according to claim 16.

26. An apparatus configured to align two periodic speech waveforms, said apparatus comprising:

a shifter configured to shift a first one of two periodic speech waveforms by a non-zero value within an alignment range, prior to calculating a first and a second correlation measure;

a trigonometric function evaluator configured to evaluate a result of trigonometric function of an angle by evaluating a single cosine and a single sine; and a calculator configured to calculate, (1) the first correlation measure between (A) a first one of the two periodic speech waveforms, as shifted by a first phase shift and (B) a second one of the two periodic speech waveforms using the result of the trigonometric function, and (2) the second correlation measure between (C) the first one of the two periodic speech waveforms, as shifted by a second phase shift, and (D) the second one of the two periodic speech waveforms using the result of the trigonometric function, wherein cross-correlations for multiple different phase shifts are determined using the single cosine and the single sine.

27. The apparatus according to claim 26, wherein said calculator generates a first and second plurality of correlation measures by performing calculations (1) and (2) for a plurality of phase shifts and applies to the first one of the two periodic speech waveforms, the phase shift corresponding to an identified maximum among the first plurality of generated correlation measures and the second plurality of generated correlation measures.

28. The apparatus according to claim 26, wherein said calculator is configured to calculate the first correlation measure to include a plurality of sums of (E) products of evaluated cosines and (F) products of evaluated sines, and wherein, for each of the first plurality of phase shifts, said calculator is configured to calculate the second correlation measure to include a plurality of differences of (G) products of the evaluated cosines and (H) products of the evaluated sines.

29. The apparatus according to claim 26, wherein said apparatus comprises a prototype extractor configured (i) to extract a first prototype waveform from a residual of a first portion in time of a speech signal and (ii) to extract a second prototype waveform from a residual of a second portion in time of the speech signal, wherein the first one of the two periodic speech waveforms is based on the first prototype waveform, and wherein the second one of the two periodic speech waveforms is based on the second prototype waveform.

30. The apparatus according to claim 29, wherein a length of each of the two periodic speech waveforms is equal to a pitch period of at least one of the first and second portions in time of the speech signal.

31. The apparatus according to claim 29, wherein, the first phase shift is one of a plurality of phase shifts, each of the plurality of phase shifts corresponds to a different harmonic frequency of the first prototype waveform.

32. The apparatus according to claim 26, wherein the first phase shift is one of a plurality of phase shifts within the range of zero radians to π radians inclusive.

33. The apparatus according to claim 26, wherein, the second phase shift is one of a plurality of phase shifts within the range of π radians to 2π radians exclusive.

34. A speech coder including the apparatus according to claim 26.

35. A cellular telephone including the apparatus according to claim 26.

36. A method of aligning two periodic speech waveforms, said method comprising:

prior to a first iteration, shifting a first one of two periodic speech waveforms by a first shift value;

performing the first iteration over a first evaluation range with a first resolution in order to obtain a first index value;

after the first iteration and prior to a second iteration, shifting the first one of two periodic speech waveforms by a second shift value, wherein the second shift value is based on the first index value; and performing the second iteration over a second evaluation range with a second resolution in order to obtain a second index value, wherein the second evaluation range is smaller than the first evaluation range and the second resolution is higher than the first resolution.

37. The method of aligning according to claim 36, wherein said first shift value is a pre-determined non-zero value greater than zero radians and less than, or equal to, π radians.

38. The method of aligning according to claim 36, wherein said performing the first iteration comprising:

determining the first evaluation range;

determining the first resolution;

calculating a cross-correlation between the two periodic speech waveforms; and determining the first index value that corresponds to a maximum cross-correlation value.

39. The method of aligning according to claim 36, wherein said performing the second iteration comprising:

determining the second evaluation range;

determining the second resolution;

calculating a cross-correlation between the two periodic speech waveforms; and determining the second index value that corresponds to a maximum cross-correlation value.

40. A non-transitory computer-readable storage medium encoded with machine-executable instructions configured to cause one or more processors to execute the method according to claim 36.

41. An apparatus configured to align two periodic speech waveforms, said apparatus comprising:

prior to a first iteration, means for shifting a first one of two periodic speech waveforms by a first shift value;

means for performing the first iteration over a first evaluation range with a first resolution in order to obtain a first index value;

after the first iteration and prior to a second iteration, means for shifting the first one of two periodic speech waveforms by a second shift value, wherein the second shift value is based on the first index value; and means for performing the second iteration over a second evaluation range with a second resolution in order to obtain a second index value, wherein the second evaluation range is smaller than the first evaluation range and the second resolution is higher than the first resolution.

42. The apparatus according to claim 41, wherein said first shift value is a pre-determined non-zero value greater than zero radians and less than, or equal to, $\pi$ radians.

43. The apparatus according to claim 41, wherein said means for performing the first iteration comprising:

means for determining the first evaluation range;

means for determining the first resolution;

means for calculating a cross-correlation between the two periodic speech waveforms; and means for determining the first index value that corresponds to a maximum cross-correlation value.

44. The apparatus according to claim 41, wherein said means for performing the second iteration comprising:

means for determining the second evaluation range;

means for determining the second resolution;

means for calculating a cross-correlation between the two periodic speech waveforms; and means for determining the second index value that corresponds to a maximum cross-correlation value.

45. An apparatus configured to align two periodic speech waveforms, said apparatus comprising a processor configured to:

(1) shift a first one of two periodic speech waveforms by a first shift value prior to a first iteration;

(2) perform the first iteration over a first evaluation range with a first resolution in order to obtain a first index value;

(3) shift the first one of two periodic speech waveforms by a second shift value after the first iteration and prior to a second iteration; and (4) perform the second iteration over a second evaluation range with a second resolution in order to obtain a second index value, wherein the second shift value is based on the first index value and wherein the second evaluation range is smaller than the first evaluation range and the second resolution is higher than the first resolution.

46. The apparatus according to claim 45, wherein said first shift value is a pre-determined non-zero value greater than zero radians and less than, or equal to, $\pi$ radians.

47. The apparatus according to claim 45, wherein said processor configured to determine the first evaluation range;

determine the first resolution;

calculate a cross-correlation between the two periodic speech waveforms; and determine the first index value that corresponds to a maximum cross-correlation value.

48. The apparatus according to claim 45, wherein said processor configured to determine the second evaluation range;

determine the second resolution;

calculate a cross-correlation between the two periodic speech waveforms; and determine the second index value that corresponds to a maximum cross-correlation value.

* * * * *